US007639700B1

(12) United States Patent
Nabhan et al.

(10) Patent No.: US 7,639,700 B1
(45) Date of Patent: *Dec. 29, 2009

(54) ARCHITECTURE FOR EFFICIENT UTILIZATION AND OPTIMUM PERFORMANCE OF A NETWORK

(75) Inventors: Tarek Nabhan, Cairo (EG); Youssri Helmy, Los Altos, CA (US)

(73) Assignee: F5 Networks, Inc., Seattle, WA (US)

( * ) Notice: Subject to any disclaimer, the term of this patent is extended or adjusted under 35 U.S.C. 154(b) by 391 days.

This patent is subject to a terminal disclaimer.

(21) Appl. No.: 11/551,582

(22) Filed: Oct. 20, 2006

Related U.S. Application Data

(63) Continuation of application No. 10/354,438, filed on Jan. 29, 2003, now Pat. No. 7,126,955.

(51) Int. Cl.
*H04L 12/26* (2006.01)

(52) U.S. Cl. .................................... 370/401; 370/473

(58) Field of Classification Search .................. None
See application file for complete search history.

(56) References Cited

U.S. PATENT DOCUMENTS

| 4,891,643 | A | 1/1990 | Mitchell et al. |
| 5,276,898 | A | 1/1994 | Kiel et al. |
| 5,333,212 | A | 7/1994 | Ligtenberg |
| 5,488,483 | A | 1/1996 | Murayama |
| 5,559,978 | A | 9/1996 | Spilo |
| 5,646,946 | A | 7/1997 | VanderMeer et al. |
| 5,657,452 | A | 8/1997 | Kralowetz et al. |
| 5,657,525 | A | 8/1997 | Hoyt et al. |
| 5,768,525 | A | 6/1998 | Kralowetz et al. |
| 5,909,250 | A | 6/1999 | Hardiman |
| 5,945,933 | A | 8/1999 | Kalkstein |
| 6,012,062 | A | 1/2000 | Jagadish et al. |

(Continued)

FOREIGN PATENT DOCUMENTS

EP          0 929 173 A2       7/1999

(Continued)

OTHER PUBLICATIONS

Huffman, David A. (1952) "A Method for the Construction of Minimum-Redundancy Codes," Proceedings of the I.R.E., 40:1098-1101.

(Continued)

*Primary Examiner*—Chi H Pham
*Assistant Examiner*—Soon-Dong D Hyun
(74) *Attorney, Agent, or Firm*—Darby & Darby P.C.; Jamie L. Wiegand

(57) ABSTRACT

An architecture for optimizing network communications that utilizes a device positioned at two edges of a constrained Wide Area Network (WAN) link. The device intercepts outgoing network packets and reroutes them to a proxy application. The proxy application uses persistent connections with a network accelerator device at the other end of the persistent connection. The proxy applications transmit the intercepted data after compressing it using a dictionary-based compression algorithm. Packet mangling may involve spoofing the connection request at each end node; a proxy-to-proxy communication protocol specifies a way to forward an original address, port, and original transport protocol information end to end. The packet mangling and proxy-to-proxy communication protocol assure network transparency.

15 Claims, 4 Drawing Sheets

U.S. PATENT DOCUMENTS

| | | | |
|---|---|---|---|
| 6,115,384 | A | 9/2000 | Parzych |
| 6,138,156 | A | 10/2000 | Fletcher et al. |
| 6,178,489 | B1 | 1/2001 | Singh |
| 6,304,567 | B1 | 10/2001 | Rosenberg |
| 6,314,095 | B1 | 11/2001 | Loa |
| 6,397,259 | B1 | 5/2002 | Lincke et al. |
| 6,449,658 | B1 | 9/2002 | Lafe et al. |
| 6,473,458 | B1 | 10/2002 | Shimizu et al. |
| 6,477,201 | B1 | 11/2002 | Wine et al. |
| 6,658,463 | B1 | 12/2003 | Dillon et al. |
| 6,728,785 | B1 | 4/2004 | Jungck |
| 6,763,031 | B1 | 7/2004 | Gibson et al. |
| 6,879,631 | B1 | 4/2005 | Schultz et al. |
| 6,882,753 | B2 | 4/2005 | Chen et al. |
| 6,904,176 | B1 | 6/2005 | Chui et al. |
| 6,907,071 | B2 | 6/2005 | Frojdh et al. |
| 2002/0071438 | A1 | 6/2002 | Singh |
| 2002/0136224 | A1 | 9/2002 | Motley |
| 2003/0177396 | A1 | 9/2003 | Bartlett et al. |
| 2004/0015591 | A1 | 1/2004 | Wang |
| 2004/0103215 | A1 | 5/2004 | Ernst et al. |
| 2004/0103225 | A1 | 5/2004 | McAlpine et al. |
| 2006/0265689 | A1 | 11/2006 | Kuznetsov et al. |

FOREIGN PATENT DOCUMENTS

| | | |
|---|---|---|
| EP | 0 947 104 B1 | 11/2002 |
| EP | 1 276 324 A1 | 1/2003 |
| EP | 1 424 779 A1 | 6/2004 |
| EP | 1 434 437 A2 | 6/2004 |
| WO | WO-00/07083 A1 | 2/2000 |
| WO | WO-01/37516 | 5/2001 |
| WO | WO-01/71701 A2 | 9/2001 |
| WO | WO-03/073719 A1 | 9/2003 |
| WO | WO-2004/036501 A2 | 4/2004 |

OTHER PUBLICATIONS

Ziv, J. et al. (1977) "A Universal Algorithm for Sequential Data Compression," IEEE Transactions on Information Theory, IT23(3):337-343.

Gailly, J., "gzip The data compression program", Edition 1.2.4 for Gzip Version 1.2.4, pp. 1-13, Jul. 1993. Can be found at http://www.gnu.org/software/gzip/manual/html_mono/gzip.html.

"Gzip—Wikipedia, the free encyclopedia", Wikipedia, pp. 1-4, Dec. 6, 2005. Can be found at http://en.wikipedia.org/wiki/Gzip.

Gailly, J., "Invoking gzip", pp. 1-2, Jul. 1993. Can be found at http://www.math.utah.edu/docs/info/gzip_4.html#SEC7.

"Data compression—Wikipedia, the free encyclopedia", Wikipedia, pp. 1-7, Dec. 6, 2005. Can be found at http://en.wikipedia.org/wiki/Data_compression_algorithm.

Roelofs, Greg, zlib A Massively Spiffy Yet Delicately Unobtrusive Compression Library (Also Free, Not to Mention Unencumbered by Patents), pp. 1-5, Last updated on Aug. 7, 2005. Can be found at http://www.zlib.net/.

Krintz, Chandra and Sucu, Sezgin, "Adaptive on-the-Fly Compression (Abstract)", EEE Computer Society, vol. 17, No. 1, pp. 1-2, Jan. 2006. Can be found at http://csdl2.computer.org/persagen/DLAbsToc.jsp?resourcePath=/dl/trans/td/&toc=comp/trans/td/2006/01/l1toc.xml&DOI=10.1109/TPDS.2006.3.

Gailly, J. and Adler, M., "The gzip home page", pp. 1-8, Last updated Jul. 27, 2003. Can be found at http://www.gzip.org.

"AppCelera: Smart Compression". eWEEK.com, Ziff Davis Publishing Holdings Inc., pp. 1-11, © 1996-2006. Can be found at http://www.eweek.com/article2/0,1759,755242,00.asp.

Gailly, J. and Adler, M., "zlib 1.1.4 Manual", pp. 1-14, Mar. 11, 2002. Can be found at http://www.zlib.net/manual.html.

F5 Networks, Inc., "Configuration Guide for Local Traffic Management" Version 9.0, MAN-0122-01, Chapter 6, pp. 1-26, © 1996-2005.

Fielding, R., at al., "Hypertext Transfer Protocol—HTTP/1.1", IEFT, RFC 2616, pp. 1-18. Jun. 1999.

Pierzchala, Stephen, "Compressing Web Content with mod_gzip and mod_deflate", Linux Journal, pp. 1-10, Apr. 26, 2004. Can be found at http://linuxjournal.com/article/6802.

"Data compression ratio—Wikipedia, the free encyclopedia", Wikipedia, pp. 1-2, Dec. 6, 2005. Can be found at http://en.wikipedia.org/wiki/Data_compression_ratio.

"HTTP Compression Speeds up the Web What is IETF Content-Encoding (or HTTP Compression)?", pp. 1-5. Can be found at http://webreference.com/internet/software/servers/http/compression/2.html.

Deutsch, P., "GZIP file format specification version 4.3", IETF, RFC 1952, pp. 1-12, May 1996.

Berners-Lee, T., et al., "Hypertext Transfer Protocol—HTTP/1.0", IETF, RFC 1945, pp. 1-23, May 1996.

"HTTP Compression Speeds up the Web", pp. 1-5. Can be found at http://webreference.com/internet/software/servers/http/compression/, Oct. 13, 2000.

Leurs, L., "Flate/deflate ompression", pp. 1-2, © 2000. Can be found at http://prepressure.com/techno/compressionflate.htm.

Deutsch, P. and Gailly, J., "ZLIB Compressed Data Format Specification version 3.3", IETF, RFC 1950, pp. 1-11, May 1996.

Jeannot, Emmanuel, et al., "Adaptive Online Data Compression", 11th IEEE International Symposium on High Performance Distributed Computing, pp. 1-57, 2002.

Deutsch, P., "DEFLATE Compressed Data Format Specification version 1.3", IETF, RFC 1951, pp. 1-17, May 1996.

Gailly, J., "Overview", pp. 1-2, Jul. 1993. Can be found at http://www.math.utah.edu/docs/info/gzip_2.html#SEC5.

Friend, R. and Monsour, R., "IP Payload Compression Using LZS", IETF, RFC 2395, pp. 1-9, Dec. 1998.

Heath, J. and Border, J., "IP Payload Compression Using ITU-T V.44 Packet Method", IEFT, RFC 3051, pp. 1-8, Jan. 2001.

Seshan, Srinivasan, et al., "SPAND: Shared Passive Network Performance Discovery", USENIX Symposium on Internet Technologies and Systems, pp. 1-13, Dec. 1997.

"HTTP Compression", pp. 1-5, Last modified Jan. 17, 2006. Can be found at http://www.websiteoptimization.com/speed/tweak/compress/.

Peraira, R., "IP Payload Compression Using DEFLATE", IEFT, RFC 2394, pp. 1-6, Dec. 1998.

Roelofs, Greg, et al., "zlib Frequently Asked Questions", pp. 1-7, last modified Jul. 18, 2005 by Mark Adler, © 1996-2005. Can be found at http://www.zlib.net/zlib_faq.html#faq38 <http://www.zlib.net/zlib_faq.html>.

ARCHITECTURE FOR EFFICIENT UTILIZATION AND OPTIMUM PERFORMANCE OF A NETWORK

CROSS-REFERENCE TO RELATED APPLICATIONS

This utility patent application is a continuation of U.S. patent application Ser. No. 10/354,438 filed on Jan. 29, 2003, entitled "Architecture for Efficient Utilization and Optimum Performance of a Network," the benefit of which is claimed under 35 U.S.C. § 120 and further incorporated herein by reference.

BACKGROUND OF THE INVENTION

The present invention relates to increasing performance of Wide Area Network (WAN) communications and in particular to a device positioned at both ends of a constrained link that reroutes outgoing packets to a proxy application that implements data compression.

The growth in data communication traffic, including email, client/server applications, multimedia applications, Internet and intranet applications, has continued to cause critical bandwidth shortages across many networks. This demand for instant data communication often exceeds the amount of bandwidth available, resulting in congestion and delay. As more applications move from Local Area Networks (LANs) to Wide Area Networks (WANs) application performance and response time issues become critical to continued smooth operation of an enterprise. With offices widely distributed around the globe and present day budgetary constraints, the implementation of additional wide area links is cost prohibitive for many international installations. Consequently, application and network architects need additional solutions to help them efficiently use existing bandwidth to support more applications and more end users.

The Open Systems Interconnection (OSI) reference model is a widely used model describing the flow of data traffic across a network. The OSI model has seven layers; each of the seven layers communicates with a layer below it through a specific interface and its peer layer on a different system in the network through a specific protocol. The combination of all networking protocol layers is often referred to as the networking stack. Packet based Transmission Control Protocol over Internet Protocol (TCP/IP) is perhaps the most widely known protocol in use in the Internet. IP is a network layer (Layer 3) protocol that defines a set of standards for addressing and routing of packets across a connectionless network. TCP is a connection oriented, transport layer (Layer 4) protocol that defines a way to ensure reliable transport of information.

Encoding or compression of network communication data is a natural choice of reducing the amount of traffic needed to be carried over a network link. Different schemes have been previously proposed for reducing traffic via compression. Most of these implementations concentrate on compressing traffic at the IP layer (Layer 3) of the OSI model. These Layer 3 encoding techniques are typically based on intra-packet and/or inter-packet compression schemes that have been described in the prior art. The aim of these schemes is to reduce the number of bytes transmitted in every packet; thus, these systems encode each packet or datagram independently, based upon information within each packet. Since they are not capable of detecting repetition of entire packets or repetitions that exist across multiple packets, they typically may miss many possible repetitions and therefore do not yield a high degree of reduction.

It is also well known to compress data at a much higher layer of the communications networking stack, such as at the application layer (Layer 7). For instance, images can be compressed in a variety of formats such as the Graphics Interchange Format (.gif) or the Joint Photographic Experts Group format (.jpeg). These data file-encoding formats reduce the space required for storage for such an image as well as its transmission. Hence, at the application layer a server may encode all of its images in the (.gif) format before transmission to a client on the other end of a WAN connection. Each image received by the client would then be decoded at the application layer to generate the original viewable image.

However, this form of application layer encoding and/or compression is typically performed offline, on single objects, prior to transmission. Such application layer encoding is not performed in an online fashion within a continuous communications stream. These types of encoding schemes are thus largely based only on intra-object information, that is, information contained in a single image, rather than inter-object information that consider data from all of the different objects to be transmitted from one or more servers to one or more clients.

For example, International Patent Publication Number WO 01/37516 describes a technique whereby a private network connection is implemented between devices known as accelerator exchange servers. A corresponding accelerator exchange client software is installed at a client's. The accelerator exchange client software may be implemented as a browser program adds on, for example.

U.S. Pat. No. 5,657,452 also discloses a method for setting up a connection over a data network. A proxy engine is used to implement data compression. However, this approach requires installation of the proxy engine so that it runs in a local endpoint node application.

SUMMARY OF THE INVENTION

The present invention provides an architecture for a network optimization computing device that provides bandwidth saving and performance boosting over constrained Wide Area Network (WAN) links. The network acceleration device is positioned at each one of at least two edges of a constrained WAN link. The device intercepts outgoing Internet Protocol (IP) packets, rerouting them to a proxy application on the same device. The proxy application uses a persistent connection with a proxy application located within a corresponding network accelerator device at the other end of the WAN link. The persistent connection is used to transmit the intercepted data after compressing it using a dictionary-based compression algorithm. The device uses techniques such as address spoofing and a proxy-to-proxy communication protocol to assure network transparency from the perspective of the client matrices, so that they do not have to install or run any special application software.

In another aspect, the present invention relates to the ability to intercept network traffic at a connection layer, and route it to a private, constrained WAN link. Rerouting of messages is done in a way in which it is transparent to the end nodes. That is, no specialized browser program and/or application software needs to be installed at the end user client computers. These devices only view a standard virtual connection; no modification is needed to their standard protocol layer processing. Responsibility for intercepting LAN TCP connection request packets and completing the proxy connections is entirely the function of the network accelerator devices.

This architecture provides a number of benefits for network optimization as compared to traditional packet based compression schemes.

To begin with, most other approaches concentrate on reducing the number of bytes each particular packet has. The approach of the present invention actually reduces the number of packets. This is because compression occurs at a higher layer than the TCP/IP layer, and the compressed stream is divided at inter-packets at the TCP layer. This technique thus results in a smaller number of "fat" or full packets to be transmitted over the LAN link, rather than a large number of "thin" or small packets.

In addition, data is transferred over the WAN link via a persistent connection. Thus, connection and termination requests packets are not repeatedly transmitted over the WAN link.

By reducing the overall number of packets network utilization is actually increased. This reduces the need for packet retransmissions due to errors, in turn reducing the load or routers in the WAN. As a result, a significant boost in the performance of applications running over the WAN is realized.

An architecture according to the present invention also offers higher bandwidth saving over traditional packet based compressions schemes. There are a number of reasons for this.

Since the architecture results in a significant reduction in the number of packets, sophisticated compression algorithms can be used with essentially no effect on the overall performance. Packet-based compression schemes are typically quite sensitive to the complexity of the compression algorithms employed, and tend to use relatively easy to implement and simple compression schemes. However, the significant packet reduction available with the present invention justifies using complex compression schemes, since the gain more than compensates for the extra processing time.

The invention may also use the same dictionary to compress all streams of data belonging to a given connection. Typically, different streams of the same connection will have a common context. In this instance, therefore, the dictionary will be relevant.

Finally, the invention employs a persistent dictionary for every persistent connection. Thus, all connections relevant to a particular type may have a common context. The dictionary thus becomes more or less like a cache for particular traffic types. For example, emails originating from a particular site may have the same fixed header or a trailer containing a confidentially notice. When these emails are sent from different client computers but all originating from the same end of a WAN connection, they will have many words in common. The application of a persistent common dictionary to the persistent connection between the two ends of the WAN link therefore results in efficient compression for the traffic, which is repeatedly sent between the two ends, regardless of the client computer from which it originates.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

To achieve the desired performance improvement the present invention employs a network accelerator device (NET ACCEL) 14 at each end of a constrained Wide Area Network (WAN) connection. In the example in FIG. 1, improved communication is to be provided between a first or Local Area Network (LAN) 11-1 and a second LAN 11-2. The respective LANs 11 each consist of a number of client computing devices located at network end nodes such as devices 10-1-1, 10-1-2, . . . 10-1-m that comprise the first LAN 11-1, and similar client devices located at nodes 10-2-1, 10-2-2, . . . 10-2-n located within the second LAN 11-2. It is important to note that the devices herein referred to as the "clients" 10 are unaware that their traffic is being communicated via the network accelerators 14-1 and 14-2. Traffic passing through the network accelerators 14 is compressed in a way in which is transparent to the end nodes 10 while achieving the required bandwidth reduction. The manner of implementing this will be described in detail shortly.

In general, clients 10-1 associated with first LAN 11-1 connect one or more switches 12-1 to the network accelerator 14-1 to a router 16-1. Router 16-1 has available connections to the second LAN 11-2 through a private WAN 20 that may, for example, be Internet Protocol (IP) based. The second LAN 11-2 similarly consists of a router 16-2, network accelerator, 14-2 switches 12-2 and associated clients or nodes 10-2.

Figure 2:
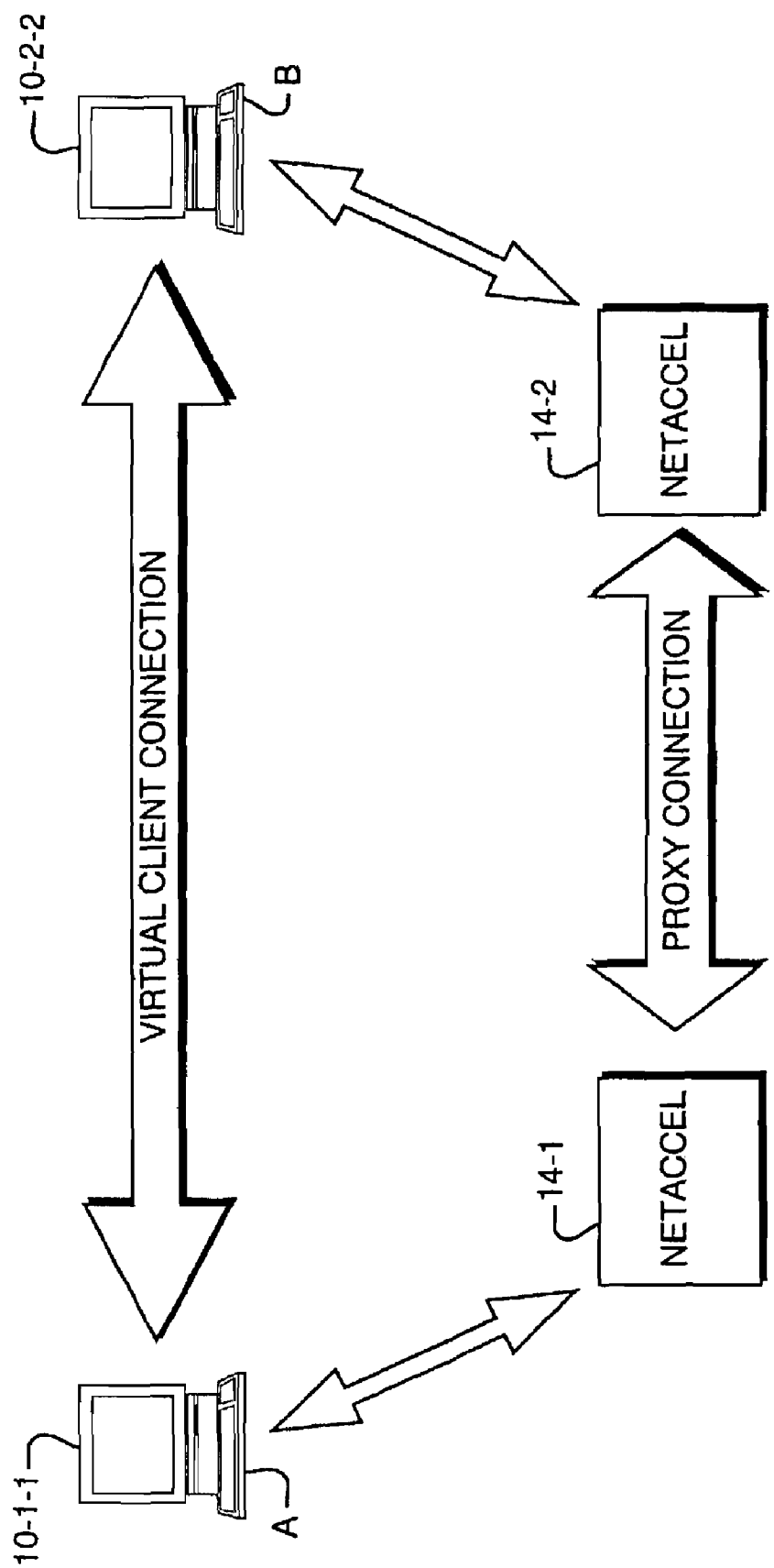
FIG. 2 is a high-level block diagram illustrating how a network transparency is achieved through the proxy connection.

The network accelerators 14-1 and 14-2 provide a proxy server for connections established between the respective LANs 11 that they serve. Thus, as shown in FIG. 2, from the perspective of client 10-1-1 and 10-2-2, they have directly established a connection in the usual way and the existence of the proxy connection is entirely transparent to them. The implementation of such a proxy is done with known address spoofing techniques to assure transparency.

Figure 1:
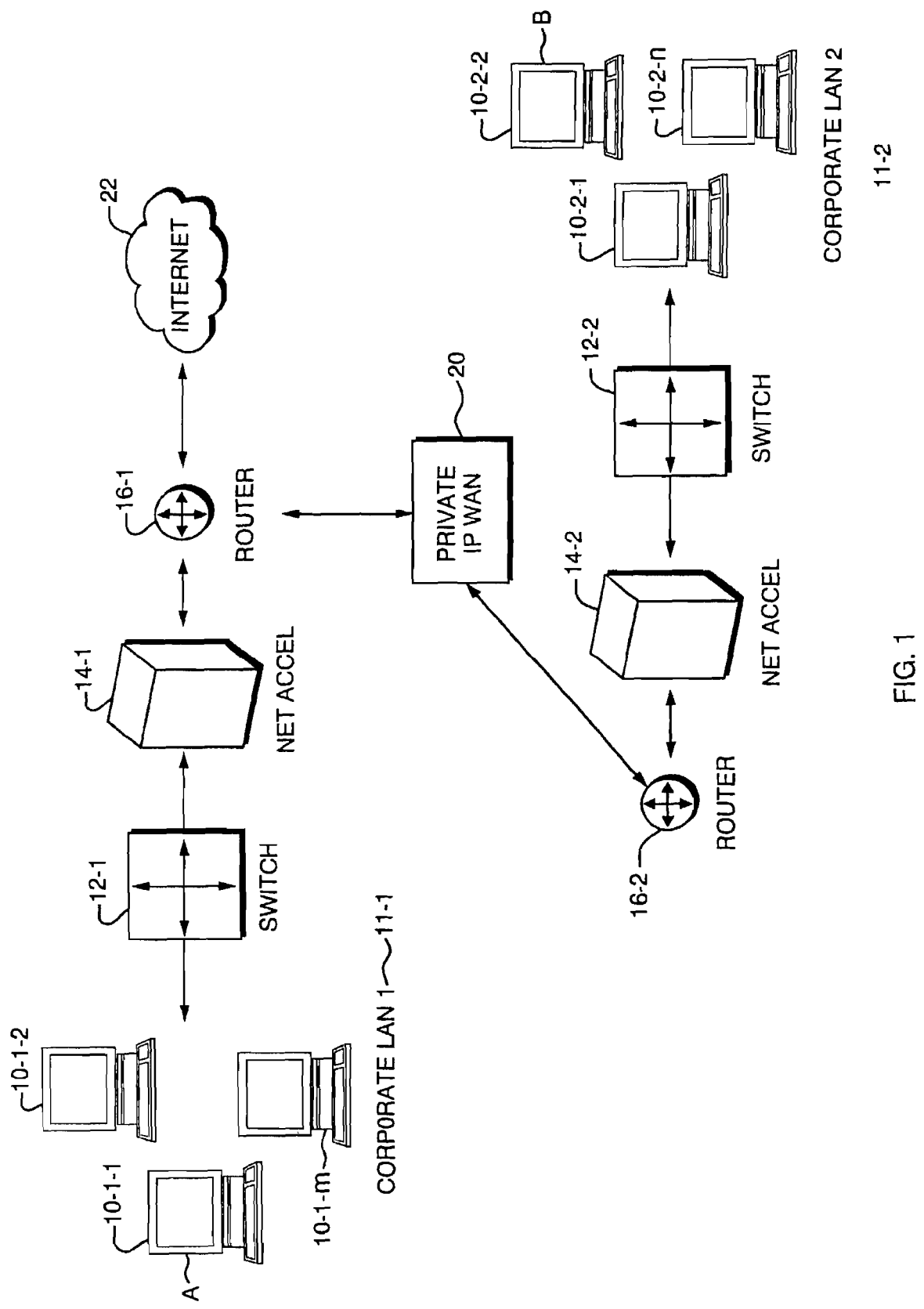
FIG. 1 is a high-level block diagram showing where network acceleration devices are implemented in a WAN network.
Figure 3:
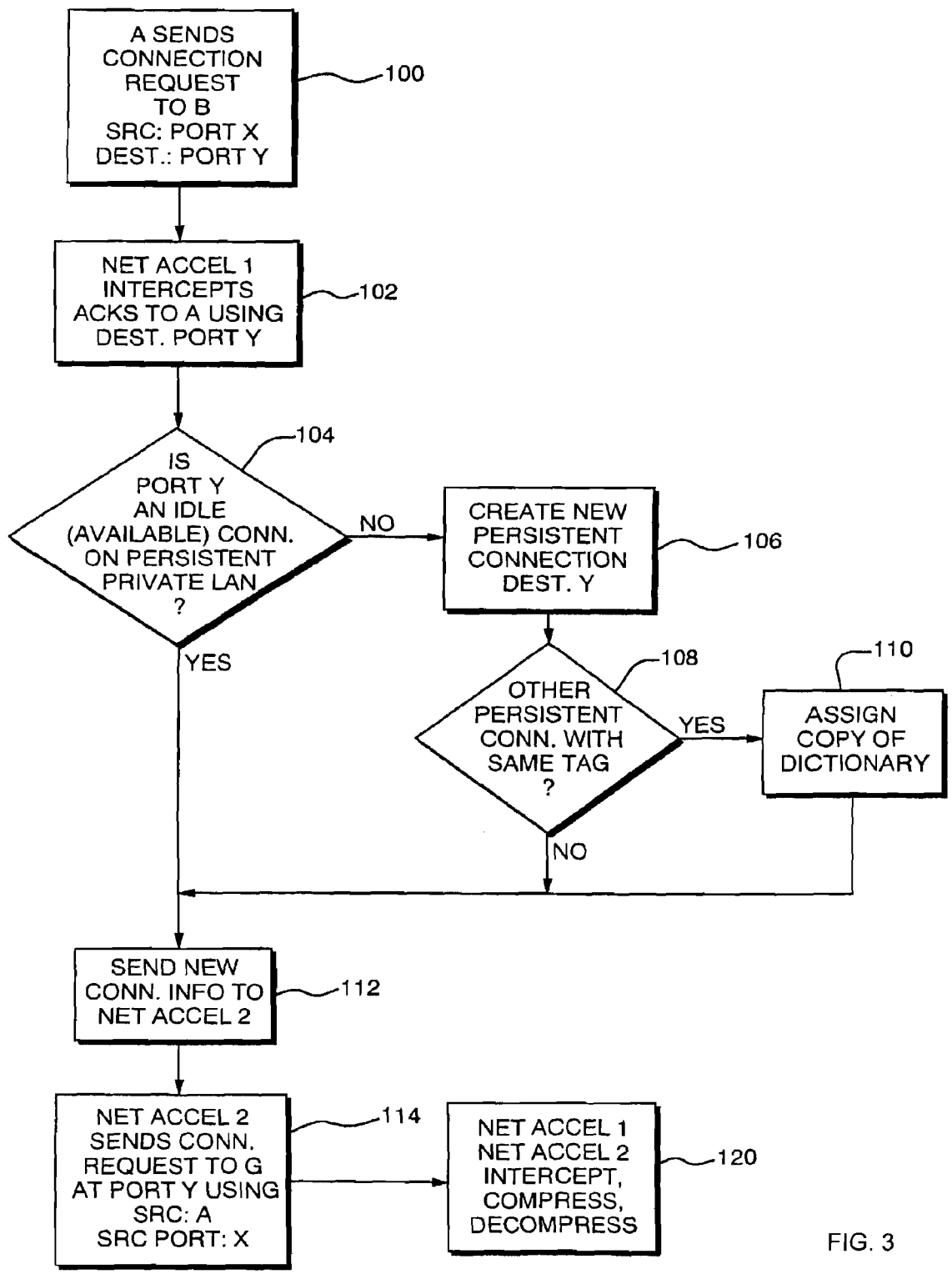
FIG. 3 is a flow diagram illustrating how LAN packets are processed.

Referring now to FIG. 3 as well as FIG. 1, consider that one of the clients 10-1-1 in the first LAN 11-1, known as Machine A, wishes to establish a connection with another client 10-2-2 in the second LAN 11-2, known as Machine B. The interaction of the main components of the system will now be described in detail. In a first step 100, a connection request packet is transmitted from Machine A. The connection requests that a connection be established between Machine A and Machine B. The connection request may, for example, specify port x for Machine A and port y for Machine B. At the TCP level, the connection request may take the form of a SYN message.

In the next step 102, the network accelerator 14-1 associated with the first LAN 11-1 is the first to intercept the connection request. It completes the connection request with Machine A by spoofing Machine B. For example, a response by network accelerator 14-1 is provided to Machine A using the destination address and port specified in the intercepted connection address, and replying to Machine A with a proxy acknowledgement in such a way as to fool Machine A into thinking it is connecting directly to Machine B when in fact it is not. This interception is performed by a proxy application running on the network accelerator as will be described in connection with FIG. 4.

The proxy application running on network accelerator 14-1 then assigns one of the persistent connections it has with the network accelerator 14-2 to handle the connection requested by Machine A. This can be done through the process beginning at state 104.

For example, a determination can first be made by network accelerator 14-1 if port y is reachable through an available persistent connection. If so, the existing connection with the second network accelerator 14-2 associated with the second LAN 11-2 will be discovered, and the connection request by Machine A will be associated with this existing persistent connection. If, however, no suitable persistent connection already exists, then a state 106 is entered in which a new persistent connection will be requested and established between network accelerators 14-1 and 14-2. This can be accomplished by passing connection request messages through the network that discover other compatible network accelerator 14.

In the next state 108, once the new persistent connection is established a determination is made whether or not a persistent connection has already been established for the same traffic type. If the answer is yes, then a copy of the existing compression dictionary for that persistent connection will be assigned to handle the new connection in state 110.

In any event, processing next continues to a state 112 where the new connection information is passed in a message between network accelerator 14-1 and network accelerator 14-2. The information defines the characteristics of the desired connection between Machine A and Machine B.

In state 114, network accelerator 14-2 finally receives a connection request. In response, it then sends its own connection request to Machine B on its local LAN 14-2. This connection request is established at port y using a source address for Machine A and source port x. Thus, network accelerator 2 also spoofs its connection to Machine B at its local end. With the end to end connection now set up through the proxies associated with network accelerators 14-1 and 14-2, LAN packets may now travel between Machine A and Machine B through the proxies provided by network accelerators 14-1 and 14-2. All packets related to established connections are intercepted by a network accelerator 14 and rerouted to a proxy application running on it. The proxy application compresses the rerouted data using a dictionary assigned to the persistent connection that the data belongs to. The compressed data is then sent to the remote network accelerator at the other end of the proxy connection. The proxy running on the remote network accelerator decompresses the received stream, and then sends it to the corresponding client using the source and destination address and ports that it has for this connection.

If the clients 10 are using Datagram Protocol (UDP), the traffic is handled in a slightly different way. Generally, it is desirable if UDP packets are intercepted and compressed as explained above. However, they are preferably retransmitted between the network accelerators via a suitable persistent TCP connection. Moreover, it is possible to parse some UDP-based protocols, such as RTSP, in order to obtain information that can facilitate compression.

Figure 4:
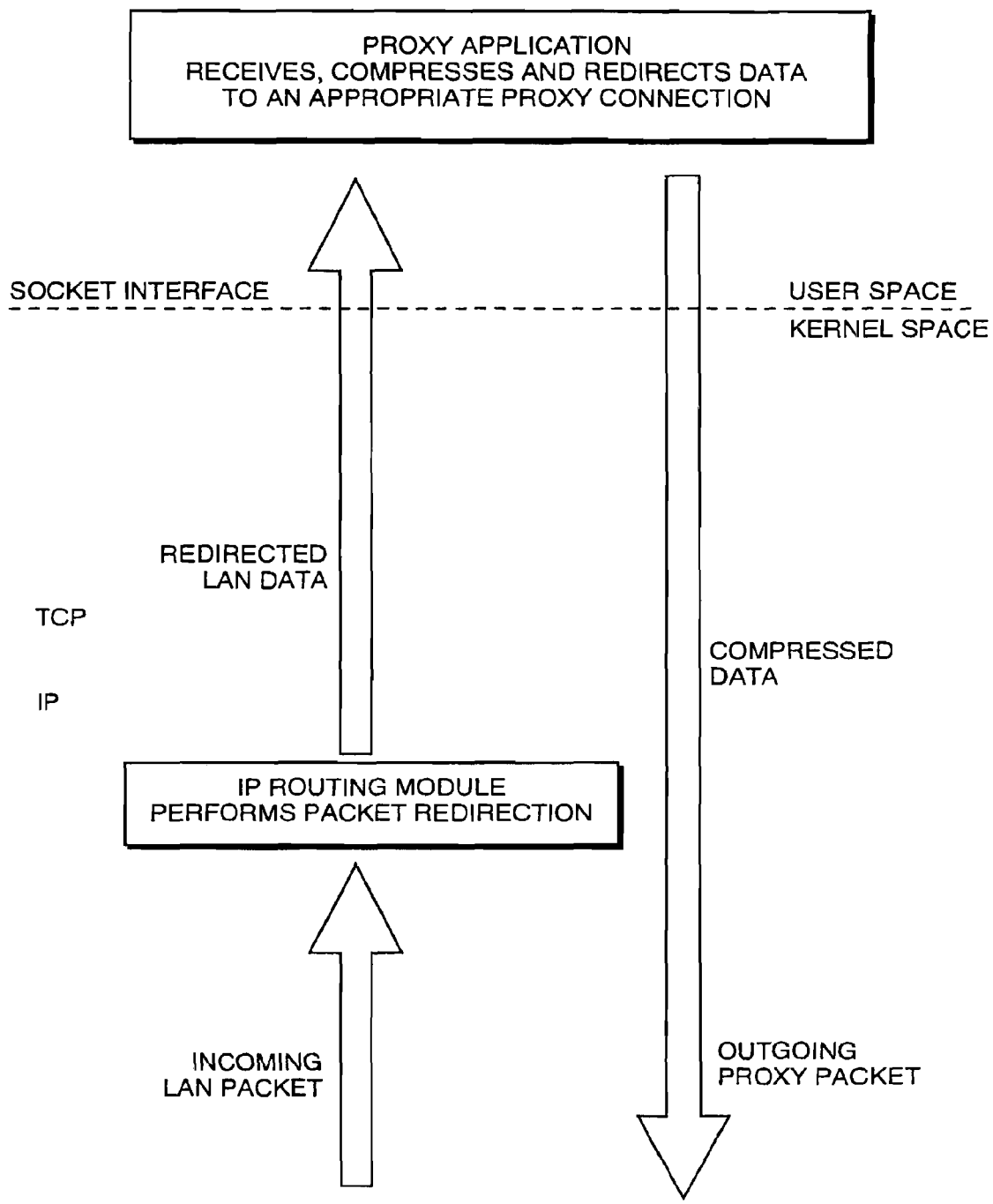
FIG. 4 is a software hierarchy illustrating where the proxy is located.

FIG. 4 is a high-level software diagram for implementation of the invention. An IP packet routing module within each network accelerator 14 performs packet redirection functions on incoming LAN packets. These are passed through IP and TCP layers, redirecting the packets to a proxy application 200. The proxy application 200 may access the rerouted data via standard socket API calls.

The proxy application then receives, compresses and redirects data to an appropriate proxy connection (as was described in connection with the steps 104 through 114 in FIG. 3.) On the receiver side, compressed data is fed out from the proxy application, back down through the protocol layers to provide the outgoing proxy packets.

The system therefore consists of at least two network accelerators 14-1 and 14-2 with one positioned at each end of a Wide Area Network (WAN) link. The WAN link provides available persistent connections between network accelerator machines 14.

In order for each remote network accelerator to be informed of the characteristics of the connection it is dealing, a proxy-to-proxy protocol is employed. Information transmitted via this proxy-to-proxy protocol includes at least the original transport protocol i.e., information as to whether or not the original protocol is TCP or UDP, original addresses and parts, start and end points for data and any possible error conditions.

In addition, packet "mangling" techniques are used so that all packets originating from a network-computing device to its local LAN are spoofed to reflect the characteristics of the original connection. Thus Machine A is at all times of the impression that it communicating directly with Machine B, and vise versa. The existence of the network accelerators 14-1 and 14-2 completely unknown to Machines A or Machines B. In addition, both A and B are not aware that compression algorithms are employed.

In the preferred embodiment, the compression scheme used is a variation of LZ77 and Huffman coding compression algorithms. The original LZ77 algorithm is described in a paper by Ziv J., et al., "A Universal Algorithm for Sequential Data Compression," IEEE Transactions on Information Theory, Vol. IT-23 (1979) pp. 337-343, although variants thereof can be used. The Huffman coding compression algorithm is described in "A Method for the Construction of Minimal Redundancy Codes," Proceedings of the IRE, Vol. 40, (1952), pp. 1098-1101, although again, variants can be used In a preferred embodiment, compression occurs as follow Data is first compressed using an LZ77 algorithm. This algorithm uses a persistent compression dictionary associated with a persistent connection assigned to transfer the data. In the next step, a Huffman coding algorithm is then applied to the results of the first step. If the results of the previous steps exceed the size of the original data, then the original data is sent as is.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network device for managing traffic over a network, comprising:
   a routing module that intercepts packet traffic and redirects the intercepted packet traffic; and
   a proxy application that performs actions, including:
      receiving the intercepted packet traffic from the routing module;
      compressing data within the intercepted packet traffic, the compression occurring on data in the packet traffic expressed in at least one layer of the Open Systems Interconnection (OSI) reference model above a transport layer, and wherein inter-packet boundaries for the compressed data are determined at the transport layer; and transmitting the compressed packet traffic over the network.

2. The network device of claim 1, wherein transmitting the compressed packet traffic further comprises transmitting the compressed packet traffic over a persistent network connection maintained with another network device.

3. The network device of claim 1, further comprising:
a dictionary that is used by the proxy application in compressing the data.

4. The network device of claim 1, wherein the network device is interposed as a proxy device between a source node and a destination node for the packet traffic.

5. The network device of claim 1, wherein the network device is configured to employ a Huffman coding compression on the data within the intercepted packet traffic.

6. The network device of claim 1, wherein transmitting the compressed packet traffic over the network further comprises transmitting the compressed packet traffic to another network device that is configured to intercept the compressed data, decompress the compressed data using a compression dictionary, and to proxy the decompressed data to a destination node.

7. A method for managing a communication over a network, comprising:

intercepting from a source node a stream of packets over the network;

compressing data within the intercept stream of packets, wherein the data is expressed in at least one layer above a transport layer of the Open Systems Interconnection (OSI) reference model, and inter-packet boundaries for compressing the data within the stream are determined at the transport layer; and transmitting the compressed stream of packets over the network.

8. The method of claim 7, further comprising:

intercepting the compressed stream of packets over the network;

employing a compression dictionary to decompress the compressed stream of packets for which the inter-packet boundaries are determined for the compressed stream; and proxying the decompressed stream of packets to a destination node.

9. The method of claim 7, wherein transmitting the compressed stream of packets further comprises transmitting the compressed stream over a persistent connection maintained with a remote network device, wherein the remote network device to operate as a proxy device for a destination node for the compressed stream of packets.

10. The method of claim 7, wherein intercepting the stream of packets further comprises spoofing of a network address.

11. The method of claim 7, further comprising:
if the intercepted stream of packets are configured as User Datagram Protocol (UDP) network traffic, transmitting the compressed stream of packets as Transmission Control Protocol (TCP) network traffic.

12. The method of claim 7, wherein compressing data within the intercepted stream of packets further comprises at least one of an LZ77 or a Huffman coding compression algorithm.

13. An apparatus for proxying traffic over a network, comprising:

means for receiving packet traffic over the network from a source node;

means for compressing the received packet traffic, wherein the compression occurs on data in the packet traffic in at least one layer between a transport layer and an application layer in the Open Systems Interconnection (OSI) reference model, and inter-packet boundaries for the compressed data are determined at the transport layer; and means for proxying the compressed packet traffic over a persistent connection maintained with another apparatus.

14. The apparatus of claim 13, wherein the means for receiving packet traffic further comprises a means for spoofing a network address.

15. The apparatus of claim 13, wherein the means for compressing further employs a dictionary means.

* * * * *

UNITED STATES PATENT AND TRADEMARK OFFICE
CERTIFICATE OF CORRECTION

PATENT NO. : 7,639,700 B1  Page 1 of 1
APPLICATION NO. : 11/551582
DATED : December 29, 2009
INVENTOR(S) : Nabhan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Ninth Day of November, 2010

David J. Kappos
*Director of the United States Patent and Trademark Office*